United States Patent Office 3,262,913
Patented July 26, 1966

3,262,913
PROCESS FOR PREPARING POLYCARBONATES
Toshio Chiba, Ashigarakami-gun, Kanagawa-ken, Masao Izuka, Odawara-shi, Kanagawa-ken, and Nobuo Tsuji, Ashigarakami-gun, Kanagawa-ken, Japan, assignors to Fuji Photo Film Co., Ltd., Ashigarakami-gun, Kanagawa-ken, Japan, a corporation of Japan
No Drawing. Filed July 8, 1963, Ser. No. 293,277
Claims priority, application Japan, July 19, 1962, 37/29,776
4 Claims. (Cl. 260—47)

This invention relates to a process for preparing new aromatic polycarbonates having excellent physical, chemical and electrical properties and particularly to a process for preparing linear polycarbonates of the following general formula, $$\left[ -O-A\left( \begin{matrix} (Y)_m \\ | \\ -R_1- \\ \end{matrix} \begin{matrix} (R_2)_p \\ | \\ \end{matrix} \right)_q A - O - \underset{\underset{O}{\|}}{C} - \right]_n \quad \text{(I)}$$

where
$R_1$ is an alkylidene group,
$R_2$ is an alkyl or an aryl group,
A is a residual group of an aromatic nucleus,
Y is an inorganic atom, an inorganic group, an alkyl group or an alkoxyl group,
each of $m$ and $p$ is 0 or integer greater than 0,
$q$ is 0 or 1, and
$n$ is an integer.

Such resins are the most excellent thermoplastic so far as we know at present, because of their good impact strength and excellent dimensional stability at elevated temperature and in moisture and also because of their desirable electrical properties. Therefore, it is very useful for molding products such as insulator, packing material, etc.

In addition to the properties mentioned above, these resins show a high degree of transparency, enough to give a quite excellent photographic film base.

This polymer can be prepared by means of transesterification or through the phosgene process. In the case of the phosgene process, polycarbonates are synthesized by reaction of bis-(monohydroxyaryl)-alkane (II) of the formula:

$$HO-A\left( \begin{matrix} (Y)_m \\ | \\ -R_1- \\ \end{matrix} \begin{matrix} (R_2)_p \\ | \\ \end{matrix} \right)_q A - OH \quad \text{(II)}$$

with either of phosgene or bis-chlorocarbonate of bis-(monohydroxyaryl)-alkane in such a chlorinated hydrocarbon as methylene chloride, chloroform, 1,2-dichloroethane, the organic layer being in contact with aqueous sodium hydroxide in order to take off hydrochloric acid formed in the course of the reaction. In this case, however, the reaction proceeds only very slowly to give a product, if any, of relatively low molecular weight.

During studies on various new methods of the above reaction, we found that the time for the reaction can be considerably reduced and at the same time a homogeneous polymer of high degree of polymerization can be easily obtained in the presence of a certain kind of water insoluble or sparingly soluble secondary or tertiary amide or a mixture of such.

Thus, our present invention consists in a process for preparing polycarbonates through condensation of bis-(monohydroxyaryl)-alkane with phosgene or with bis-chlorocarbonate of bis-(monohydroxyaryl)-alkane by means of a catalyst of the general formula:

$$R'—CONH—R—NHCO—R'$$

or $$R''—CO—N—R—N—CO—R''$$
$$\phantom{R''—CO—N}|\phantom{—R—}|\phantom{N—CO—R''}$$
$$\phantom{R''—CO—}R'''\phantom{—R—N}R'''$$

or $$R'—CO—N\underset{\diagdown R \diagup}{\overset{\diagup R \diagdown}{\diagdown\phantom{X}\diagup}}N—CO—R'$$

where

R is an alkylene, an alkylidene or a polymethylene group having 2–20 carbon atoms,
R' is a cycloalkyl group having 3–20 carbon atoms, an alkyl group having cycloalkyl branch, or alkyl or aralkyl group bearing at least one tertiary or quaternary carbon atom in its alkyl or aralkyl part, and
each of R'' and R''' can either be a straight chain alkyl group having 1–20 carbon atoms, a cycloalkyl group having 3–20 carbon atoms, alkyl group having cycloalkyl branch, or alkyl or aralkyl group bearing at least one tertiary or quaternary carbon atom in its alkyl or aralkyl part.

Even a small amount of a tertiary amine or its salt, as is described in Japanese patent application publication No. 5,592/1959, makes the rate of the reaction too large to permit good control over the reaction and thus to produce a polymer of high molecular weight. Particularly in a small scale preparation, polymerization is complete within 1 minute, and even in a large scale preparation, it is complete within 10 minutes. Even with the aid of a chain terminating agent, the molecular weights of the products of these two reactions are considerably different from each other, and thus the control of the process is difficult.

Moreover, because of such a high rate of reaction, it also proceeds heterogeneously accompanied by a partial gelatination phenomenon and, as the result, a part of the product is sometimes insoluble or hardly soluble in solvents.

It is a well-known fact that such a phenomenon leads to the production of so-called "fish eyes" which gives heterogeneous spots in the film, during the film making process.

Furthermore because of the rapid and heterogenous reaction, the range of the molecular weight distribution becomes very wide and undesirable, and for this reason the physical properties of the polymer are lowered and reproducibility is impossible.

According to the process of the present invention, it is possible to synthesize reproducibly polymers having excellent properties desirable for polycarbonates, since the reaction is not so rapid and violent as in case of the process in which tertiary amine or its salt are used; and control of the reaction as well as control of the molecular weight, becomes much easier and therefore the polymer obtained has no abnormal distribution of molecular weight.

Moreover, according to the present invention, both the rate of the reaction and the molecular weight of products are quite satisfactory in comparison with the use of no catalyst or the use of a quaternary ammonium compound.

The secondary acid amines in the formula of which R' is a straight chain alkyl group, though soluble in solvents having comparatively high polarity, are rather insoluble in solvents as are ordinarily used to prepare the polycarbonates, such as chlorinated hydrocarbons, aromatic hydrocarbons, dioxane, etc.

In order to increase the solubility in the ideal solution represented by the following equation:

$$\ln S = -\frac{H_f}{R}\left(\frac{1}{T} - \frac{1}{T_f}\right)$$

where S is solubility in molar fraction, R is gas constant, $H_f$ is heat of fusion, T is the temperature of solution (° K.) and $T_f$ is the melting point (° K.), the heat of fusion ($H_f$) should be reduced. For this purpose, it is necessary to introduce branching into the molecule, in order to make the configuration irregular and to separate the molecules from one another.

In the present invention, therefore, secondary or tertiary acid amides carrying as many branches or bulky groups as possible are used, and these acid amides should be soluble in the organic solvents used for the synthesis and insoluble or hardly soluble in the aqueous alkaline solution.

The secondary or tertiary acid amides which are used in the present invention are easily prepared by admixing primary or secondary diamines with monocarboxylic acids carrying branches or bulky groups, or their esters in the molar ratio 1:2, and followed by dehydrating or dealcoholating by means of heat in the same way as the general preparation of acid amides. They can be used as catalysts with or without purification (distillation or recrystallization).

Examples of the monocarboxylic acid carrying branches or bulky groups are isovaleric acid, 2-ethyl-butyric acid, 2-ethyl-caproic acid, 2-methyl-2-ethyl-n-caproic acid, 2-methyl-2-methyl-n-heptoic acid, 2,2-diethylcaprylic acid, 2-methyl-2-butyl-capric acid, 2-ethyl-2-butyl-n-capric acid, 2-methyl-($\beta$-cyclohexylethyl)-lauric acid, 3-methyl-3-($\beta$-cyclohexylethyl)-nonanic acid, etc.

As examples of diamines are ethylene diamine, trimethylene diamine, tetramethylene diamine, pentamethylene diamine, hexamethylene diamine, heptamethylene diamine, octamethylene diamine, nonamethylene diamine, decamethylene diamine, piperazine, etc.

According to the present invention, the secondary or tertiary acid amides may be used alone or in combination. Moreover, it was found that they show a remarkable effect by addition of surface active agents. The amount of the catalyst in the present invention is not critical, but is preferably 0.5–30 weight percent based on bis-(monohydroxyaryl)-alkanes.

According to the present invention, an alkaline solution of a bis-(monohydroxyaryl)-alkane or mixture of such is dispersed in a solvent such as benzene, toluene, methylene chloride, or 1,2-dichloroethane, which are able to dissolve polycarbonates. Into this mixture, equimolar or excess phosgene is introduced under stirring and maintained at 20–30° C. and then acid amide catalysts are added singly or in combination.

After 15–90 minutes the reaction mixture grows gradually viscous and finally it becomes a highly viscous mass. Then, the upper layer of aqueous alkaline solution is removed and the mass is washed with water. After the washing, the solution of the high molecular weight material thus obtained is reprecipitated with aid of organic solvent such as alcohol, ester or ketone (e.g. methanol, ethanol, ethyl acetate, acetone, etc.) that does not dissolve polycarbonates, and is separated as a flake-like precipitate from the organic solvent.

After drying, the polycarbonates can be used for various purposes. Alternatively, after the above washing the product may be dried and the solution of the high molecular weight material which is obtained may be directly applied on metals or other supporting materials in order to form films or sheets.

In the above polycondensation reaction, it is much more convenient to control the reaction than to control the reaction using tertiary amines or their salts, because the reaction itself proceeds mildly and smoothly by using these acid amides.

Moreover, it is easy to control the molecular weight of the polymer to be obtained and the reaction is a reproducible one.

The intrinsic viscosity of the polycarbonates obtained in the present invention which is defined as follows $$\lim_{c \to 0} \eta sp/c = [\eta]$$

are 0.6–2.0 at 25° C.

Where $\eta sp$ is the specific viscosity of a polymer in methylene chloride, C is weight in grams of polymer in 100 ml. of the solvent. For example, the properties of polymer from 2,2-bis-(4-hydroxyphenyl)-propane and phosgene which is obtained by the hereafter mentioned Example 1 are as follows:

| | |
|---|---|
| Tensile strength, kg./mm.$^2$ | 8.0 |
| Elongation, percent | 8.0 |
| Yield point, kg./mm.$^2$ | 7.5 |
| Melting point, ° C. | 240–260 |
| Heat distortion temperature, ° C. | 130–140 |
| Heat shrinkage, (140° C.) | 0.13% |
| Absorption of moisture (after 24 hours immersion), percent | 0.24 |
| Transparency, percent | 93 |

Since the polycarbonates obtained by the present invention have excellent impact strength, dimensional stability, high degree of polymerization and sufficient transparency, they are not only useful for ordinary purposes such as packaging etc., but very satisfactory for photographic film base.

In addition, they have also excellent electrical properties and therefore are useful for insulating material and are suitable for various useful purposes after being molded solely or with various fillers.

This invention is further illustrated by the following examples, in which all "parts" represent "parts by weight."

*Example 1*

114 parts of sufficiently purified 2,2-bis-(4-hydroxyphenyl)-propane are dissolved in 635 parts of aqueous solution containing 60 parts of caustic soda and then the whole is dispersed into 240 parts of methylene chloride. To this dispersed mixture 55 parts of phosgene are introduced at 20–30° C. for 2.0 hours with stirring. After introduction of phosgene, 300 parts of methylene chloride are added and kept with stirring for 30 minutes. Then, at the same temperature 10 parts of the secondary acid amide of 2-ethyl-caproic acid and hexamethylene diamine

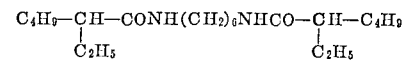

(M.P. 133–136° C.) are added and after 20 minutes the reaction mixture becomes gradually viscous and finally forms a highly viscous mass after 40 minutes. Thereafter the upper layer of the aqueous alkaline solution is removed.

After adding hydrochloric acid to the reaction mixture, the reaction is stopped.

The polycarbonate which is obtained after washing with water and evaporating off the solvent, shows the above properties and its intrinsic viscosity determined by the above method is 1.20. The product shows excellent mechanical, chemical, physical and electrical properties.

*Example 2*

Commercial 2,2-bis-(4-hydroxyphenyl)-propane and phosgene are reacted in the same manner as in Example 1.

Instead of the secondary acid amide which is used in Example 1, 8.0 parts of the secondary acid amide from 2-ethyl-caproic acid and ethylene diamine

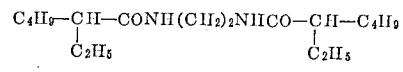

are added with stirring and reaction is continued as in Example 1.

The produced polycarbonate has the same excellent properties as the product of Example 1 and has an intrinsic viscosity of 1.03 at 25° C.

*Example 3*

A reaction is undertaken under the conditions as in Example 1 except that 10 parts of the secondary acid amide from isobutyric acid and ethylene diamine are used instead of the acid amide of Example 1.

The polycarbonate shows the same excellent properties as the products of the preceding examples and has an intrinsic viscosity of 0.70 at 25° C.

What we claim is:
1. A process for the production of a polycarbonate which comprises condensation-reacting a bis-(monohydroxyaryl)-alkane with a compound selected from the class consisting of phosgene and a bis-chloro-carbonic acid ester of a bis-(monohydroxyaryl)-alkane in the presence of an acid-acceptor consisting of a caustic alkali and in the presence of a catalyst selected from the class consisting of those acid amides represented by the following formulas

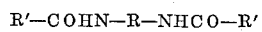

R'—COHN—R—NHCO—R'

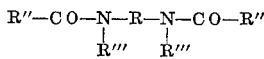

R''—CO—N—R—N—CO—R''
       |      |
      R'''  R''' and

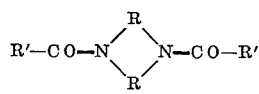

wherein R represents a member selected from the class consisting of an alkylene group and an alkylidene group, said groups each having 2 to 10 carbon atoms; R' represents a member selected from the class consisting of a cycloalkyl group having 3 to 20 carbon atoms, an alkyl group having cycloalkyl branches, and aralkyl and alkyl groups bearing at least one tertiary or quaternary carbon atom; and R'' and R''' each represents a member selected from the class consisting of straight chain alkyl group having 1–20 carbon atoms and the groups represented by symbol R' in the above definition.

2. The process according to claim 1 in which the catalyst is the secondary acid amide of 2-ethyl-caproic acid and hexamethylene diamine.

3. The process according to claim 1 in which the catalyst is the secondary acid amide of 2-ethyl-caproic acid and ethylene diamine.

4. The process according to claim 1 in which the catalyst is the secondary acid amide from isobutyric acid and ethylene diamine.

References Cited by the Examiner
UNITED STATES PATENTS 2,964,797 12/1960 Peilstocker et al. _____ 260—47
3,148,985 9/1964 Ossenbrunner et al. ___ 260—47

SAMUEL H. BLECH, *Primary Examiner.*